United States Patent
Sun et al.

(10) Patent No.: US 10,200,874 B2
(45) Date of Patent: Feb. 5, 2019

(54) SIGNATURE SEQUENCE FOR SYSTEM IDENTIFICATION IN A SHARED SPECTRUM

(71) Applicant: QUALCOMM Incorporated, San Diego, CA (US)

(72) Inventors: Jing Sun, San Diego, CA (US); Taesang Yoo, San Diego, CA (US); Xiaoxia Zhang, San Diego, CA (US); Sanaz Barghi, Carlsbad, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/642,384

(22) Filed: Jul. 6, 2017

(65) Prior Publication Data

US 2018/0091980 A1    Mar. 29, 2018

Related U.S. Application Data

(60) Provisional application No. 62/401,783, filed on Sep. 29, 2016.

(51) Int. Cl.
*H04W 16/14* (2009.01)
*H04W 74/08* (2009.01)

(52) U.S. Cl.
CPC ....... *H04W 16/14* (2013.01); *H04W 74/0808* (2013.01); *H04W 74/0816* (2013.01)

(58) Field of Classification Search
CPC ............. H04W 16/14; H04W 74/0808; H04W 74/0816

(Continued)

(56) References Cited

U.S. PATENT DOCUMENTS

| 9,887,864 B1* | 2/2018 | Han | H04W 4/70 |
| 2007/0223525 A1* | 9/2007 | Shah | H04W 72/02 |
| | | | 370/468 |

(Continued)

FOREIGN PATENT DOCUMENTS

| CN | 102185685 A | 9/2011 |
| WO | WO-2016028400 A1 | 2/2016 |

(Continued)

OTHER PUBLICATIONS

International Search Report and Written Opinion—PCT/US2017/053321—ISA/EPO—dated Jan. 5, 2018.

(Continued)

*Primary Examiner* — Mong-Thuy T Tran
(74) *Attorney, Agent, or Firm* — Loza & Loza, LLP

(57) ABSTRACT

Aspects of the disclosure relate to wireless communication systems configured to share a shared spectrum with one or more other systems (e.g., other operator networks utilizing the same radio access technology, and/or other networks utilizing different radio access technologies). Coexistence between the different systems on the shared spectrum may be provided by utilizing a technology-neutral signature waveform such as a signature sequence. A device or system may monitor a shared spectrum channel for the signature waveform, and when detected, may determine whether the shared spectrum is available for that system, or busy as occupied by another system. When the shared spectrum channel is idle, the device or system may reserve the channel by transmitting the signature waveform. Other aspects, embodiments, and features are also claimed and described.

28 Claims, 9 Drawing Sheets

(58) Field of Classification Search
USPC .......................................................... 455/454
See application file for complete search history.

(56) References Cited

U.S. PATENT DOCUMENTS

| | | | | |
|---|---|---|---|---|
| 2008/0287066 | A1* | 11/2008 | Tandai | H04L 5/0007 455/45 |
| 2009/0213813 | A1 | 8/2009 | Futagi et al. | |
| 2009/0323835 | A1* | 12/2009 | Rao | H04L 5/0007 375/260 |
| 2011/0128895 | A1* | 6/2011 | Sadek | H04W 16/14 370/280 |
| 2011/0263285 | A1* | 10/2011 | Kronander | H04L 5/00 455/509 |
| 2013/0322279 | A1* | 12/2013 | Chincholi | H04W 24/10 370/252 |
| 2016/0080117 | A1* | 3/2016 | Christoffersson | H04L 1/1887 370/329 |
| 2016/0095110 | A1 | 3/2016 | Li et al. | |
| 2016/0149683 | A1 | 5/2016 | Huang et al. | |
| 2016/0227578 | A1* | 8/2016 | Lee | H04W 74/004 |
| 2016/0242039 | A1* | 8/2016 | Drugge | H04W 16/14 |
| 2016/0248555 | A1* | 8/2016 | Lei | H04L 5/0005 |
| 2017/0331670 | A1* | 11/2017 | Parkvall | H04J 11/0079 |

FOREIGN PATENT DOCUMENTS

| | | |
|---|---|---|
| WO | WO-2016133726 A1 | 8/2016 |
| WO | WO-2016141368 A1 | 9/2016 |
| WO | WO-2016146155 A1 | 9/2016 |

OTHER PUBLICATIONS

Narrow Band Power Line Communications for Smart 3 Grid Applications Working Group: "2wg-13/0058-00-WGDC Coexistence text from IEEE Draft Standard for Low Frequency (less than 500 kHz) Narrow Band Power Line Communications for Smart Grid Application", Mar. 1, 2013, pp. 1-29, Retrieved from the Internet: URL:http://ieeexplore.ieee.org/ielx7/6491412/6491413/06491414.pdf [retrieved on Dec. 21, 2017].

* cited by examiner

SIGNATURE SEQUENCE FOR SYSTEM IDENTIFICATION IN A SHARED SPECTRUM

PRIORITY CLAIM

This application claims priority to and the benefit of provisional patent application No. 62/401,783 filed in the United States Patent and Trademark Office on 29 Sep. 2016, the entire content of which is incorporated herein by reference as if fully set forth below in its entirety and for all applicable purposes.

TECHNICAL FIELD

The technology discussed below relates generally to wireless communication systems, and more particularly, to the use of a technology-neutral signature waveform for system identification in a shared spectrum. Embodiments can provide and enable techniques for coexistence of multiple different systems in the shared spectrum.

INTRODUCTION

A shared spectrum may be a band or channel that may be shared by two or more different systems or technologies. The shared spectrum may be shared by two or more operator networks using the same radio access technology (RAT), and/or two or more RATs, each of which may be utilized by one or more operator networks within the respective RAT. Further, potentially new technologies may be added in the future to the list of users of the shared spectrum. Broadly, any suitable number of different systems (e.g., different RATs, and/or different operators within each RAT) may share the shared spectrum when they comply with the predetermined or agreed technology restrictions on its use.

A shared spectrum may be considered in some ways to be similar to an unlicensed band, such as the 2.4 GHz band used by Wi-Fi, Bluetooth, and a number of other different systems and technologies. However, unlike an unlicensed band, the shared spectrum may not be completely unrestricted. That is, not any arbitrary technology may be allowed to access the shared spectrum. Rather, an agreement may be established where certain technology restrictions may be in place to limit which systems and technologies may access and use the shared spectrum.

Within its unlicensed band, Wi-Fi technology employs a certain carrier sense (CS) or listen-before-talk (LBT) mechanism to control access to its unlicensed band. While this CS mechanism provides for functionality suitable for many purposes, the recent increase in technologies that wish to share access to the unlicensed band has created certain coexistence issues. Accordingly, for the shared spectrum, the CS coexistence mechanism used by Wi-Fi may be less than suitable or inadequate.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the present disclosure provide for the coexistence of a variety of systems and technologies for wireless communication on a shared spectrum channel. This coexistence may be provided by a technology-neutral signature waveform (e.g., a signature sequence) transmitted in front of an information burst, the signature sequence acting as a channel occupation signal.

One aspect of the present disclosure provides a method of wireless communication operable at a wireless communication device. The method monitors a shared spectrum channel to detect a transmission of a technology-neutral signature waveform. If the technology-neutral signature waveform is detected from a first system the wireless communication device is configured to use, the method monitors the shared spectrum channel for a first technology-specific waveform corresponding to the first system. If the technology-neutral signature waveform is not detected for a time greater than a threshold amount of time, the method determines that the shared spectrum channel is idle.

Another aspect of the present disclosure provides a wireless communication device including a processor, a memory communicatively coupled to the processor, and a transceiver communicatively coupled to the processor. The processor and the memory are configured to monitor a shared spectrum channel to detect a transmission of a technology-neutral signature waveform. If the technology-neutral signature waveform is detected from a first system the wireless communication device is configured to use, the processor and the memory are further configured to monitor the shared spectrum channel for a first technology-specific waveform corresponding to the first system. If the technology-neutral signature waveform is not detected for a time greater than a threshold amount of time, the processor and the memory are further configured to determine that the shared spectrum channel is idle.

Another aspect of the present disclosure provides a computer readable medium storing computer executable code including instructions for monitoring a shared spectrum channel to detect a transmission of a technology-neutral signature waveform. If the technology-neutral signature waveform is detected from a first system the wireless communication device is configured to use, the computer executable code further includes instructions for monitoring the shared spectrum channel for a first technology-specific waveform corresponding to the first system. If the technology-neutral signature waveform is not detected for a time greater than a threshold amount of time, the computer executable code further includes instructions for determining that the shared spectrum channel is idle.

Another aspect of the present disclosure provides a wireless communication device. The device includes means for monitoring a shared spectrum channel to detect a transmission of a technology-neutral signature waveform. The device further includes means for if the technology-neutral signature waveform is detected from a first system the wireless communication device is configured to use, monitoring the shared spectrum channel for a first technology-specific waveform corresponding to the first system. The device further include means for if the technology-neutral signature waveform is not detected for a time greater than a threshold amount of time, determining that the shared spectrum channel is idle.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Various aspects of the present disclosure provide for the coexistence of a variety of systems and technologies for wireless communication on a shared spectrum. This coexistence may be facilitated by transmitting a technology-neutral or technology agnostic signature waveform in front of a technology-specific waveform. The signature waveform acts as a channel occupation signal that facilitates various systems to share access to the shared spectrum. The technology-neutral signature waveform can be detected by different systems of various technologies.

In the present disclosure, reference to a technology-neutral or technology agnostic signature waveform refers broadly to any suitable waveform exhibiting the properties described below, which may be transmitted over a shared spectrum channel to serve as a channel occupation signal to different systems utilizing the shared spectrum channel. For example, each device utilizing the shared spectrum channel may transmit a technology-neutral signature waveform (e.g., a signature sequence) as a preamble before each technology-specific data burst, before a listen-before-talk (LBT) frame, or before a sequence of data bursts. This signature sequence may operate to enable devices using the shared spectrum channel to reduce or avoid interference between systems by resolving any collisions.

Figure 1:
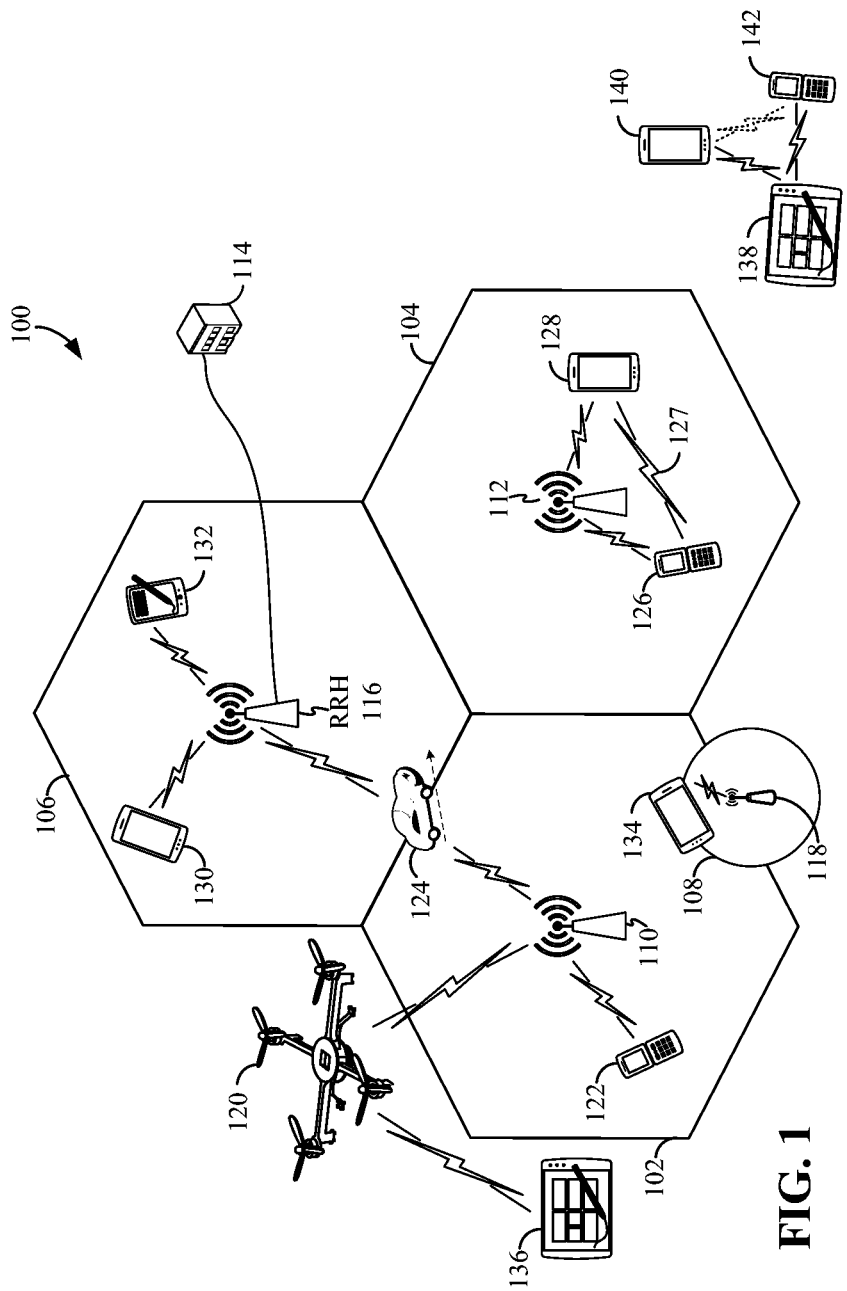
FIG. 1 is a conceptual diagram illustrating an example of an access network.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNB, or some other suitable terminology.

In FIG. 1, two high-power base stations 110 and 112 are shown in cells 102 and 104; and a third high-power base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

The radio access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the radio access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells.

In another example, a mobile network node (e.g., quadcopter 120) may be configured to function as a UE. For example, the quadcopter 120 may operate within cell 102 by communicating with base station 110. In some aspects of the disclosure, two or more UE (e.g., UEs 126 and 128) may communicate with each other using peer to peer (P2P) or sidelink signals 127 without relaying that communication through a base station (e.g., base station 112).

Unicast or broadcast transmissions of control information and/or traffic information from a base station (e.g., base station 110) to one or more UEs (e.g., UEs 122 and 124) may be referred to as downlink (DL) transmission, while transmissions of control information and/or traffic information originating at a UE (e.g., UE 122) may be referred to as uplink (UL) transmissions. In addition, the uplink and/or downlink control information and/or traffic information may be time-divided into frames, subframes, slots, and/or symbols. As used herein, a symbol may refer to a unit of time that, in an OFDM waveform, carries one resource element (RE) per subcarrier. A slot may carry a predetermined number of symbols (e.g., 7 or 14 OFDM symbols). A subframe may refer to a duration of 1 ms. Multiple subframes may be grouped together to form a single frame or radio frame. Of course, these definitions are not required, and any suitable scheme for organizing waveforms may be utilized, and various time divisions of the waveform may have any suitable duration.

The air interface in the radio access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), discrete Fourier transform (DFT)-spread OFDMA or single-carrier FDMA (DFT-s-OFDMA or SC-FDMA), sparse code multiple access (SCMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the radio access network 100 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In the radio access network 100, the ability for a UE to communicate while moving, independent of its location, is referred to as mobility. The various physical channels between the UE and the radio access network are generally set up, maintained, and released under the control of a mobility management entity (MME). In various aspects of the disclosure, a radio access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 (illustrated as a vehicle, although any suitable form of UE may be used) may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and slot timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the radio access network 100. Each of the cells may measure a strength of the pilot signal, and the radio access network (e.g., one or more of the base stations 110 and 114/116 and/or a central node within the core network) may determine a serving cell for the UE 124. As the UE 124 moves through the radio access network 100, the network may continue to monitor the uplink pilot signal transmitted by the UE 124. When the signal strength or quality of the pilot signal measured by a neighboring cell exceeds that of the signal strength or quality measured by the serving cell, the network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Figure 2:
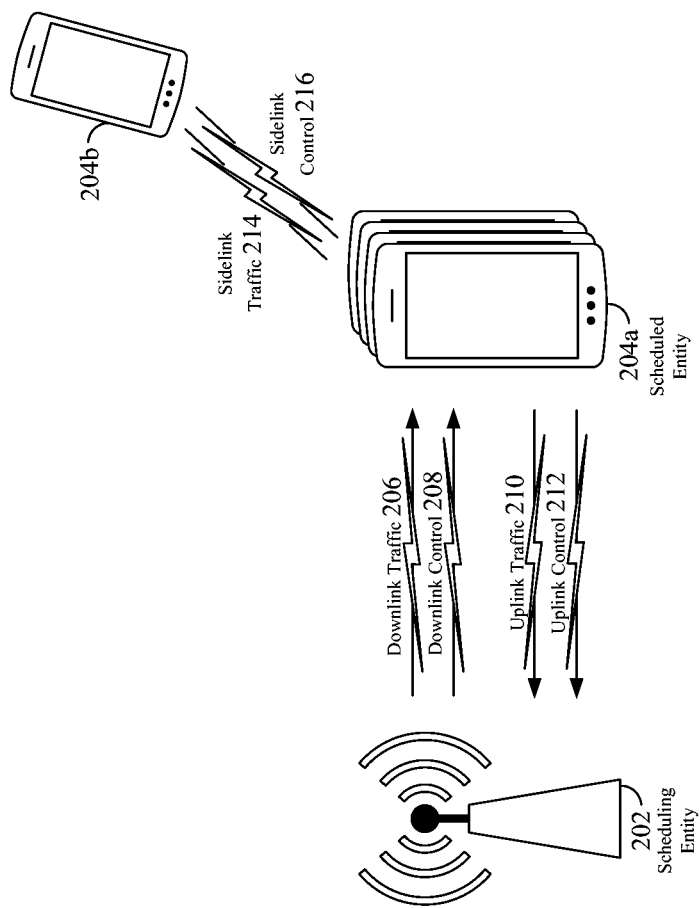
FIG. 2 is a block diagram conceptually illustrating an example of a scheduling entity communicating with one or more scheduled entities according to some embodiments

Thus, in a wireless communication network with scheduled access to time—frequency resources and having a cellular configuration, a P2P configuration, or a mesh configuration, a scheduling entity and one or more scheduled entities may communicate utilizing the scheduled resources. Referring now to FIG. 2, a block diagram illustrates a scheduling entity 202 and a plurality of scheduled entities 204 (e.g., 204a and 204b). Here, the scheduling entity 202 may correspond to a base station 110, 112, 114, and/or 118. In additional examples, the scheduling entity 202 may correspond to a UE 138, the quadcopter 120, or any other suitable node in the radio access network 100. Similarly, in various examples, the scheduled entity 204 may correspond to the UE 122, 124, 126, 128, 130, 132, 134, 136, 138, 140, and 142, or any other suitable node in the radio access network 100.

As illustrated in FIG. 2, the scheduling entity 202 may broadcast traffic 206 to one or more scheduled entities 204 (the traffic may be referred to as downlink traffic). In accordance with certain aspects of the present disclosure, the term downlink may refer to a point-to-multipoint transmission originating at the scheduling entity 202. Broadly, the scheduling entity 202 is a node or device responsible for scheduling traffic in a wireless communication network, including the downlink transmissions and, in some examples, uplink traffic 210 from one or more scheduled entities to the scheduling entity 202. Another way to describe the system may be to use the term broadcast channel multiplexing. In accordance with aspects of the present disclosure, the term uplink may refer to a point-to-point transmission originating at a scheduled entity 204. Broadly, the scheduled entity 204 is a node or device that receives scheduling control information, including but not limited to scheduling grants, synchronization or timing information, or other control information from another entity in the wireless communication network such as the scheduling entity 202.

The scheduling entity 202 may broadcast control information 208 including one or more control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 204. The PCFICH provides information to assist a receiving device in receiving and decoding the PDCCH. The PDCCH carries downlink control information (DCI) including but not limited to scheduling grants. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

Uplink traffic 210 and/or downlink traffic 206 including one or more traffic channels, such as a physical downlink shared channel (PDSCH) or a physical uplink shared channel (PUSCH) (and, in some examples, system information blocks (SIBs)), may additionally be transmitted between the scheduling entity 202 and the scheduled entity 204.

Furthermore, the scheduled entities 204 may transmit uplink control information 212 including one or more uplink control channels to the scheduling entity 202. Uplink control information may include a variety of packet types and categories, including pilots, reference signals, and information configured to enable or assist in decoding uplink traffic transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit downlink control information 208 that may schedule resources for uplink packet transmissions.

In some examples, scheduled entities such as a first scheduled entity 204a and a second scheduled entity 204b may utilize sidelink signals for direct D2D communication. Sidelink signals may include sidelink traffic 214 and sidelink control 216. Sidelink control information 216 may in some examples include a request signal, such as a request-to-send (RTS), a source transmit signal (STS), and/or a direction selection signal (DSS). The request signal may provide for a scheduled entity 204 to request a duration of time to keep a sidelink channel available for a sidelink signal. Sidelink control information 216 may further include a response signal, such as a clear-to-send (CTS) and/or a destination receive signal (DRS). The response signal may provide for the scheduled entity 204 to indicate the availability of the sidelink channel, e.g., for a requested duration of time. An exchange of request and response signals (e.g., handshake) may enable different scheduled entities performing sidelink communications to negotiate the availability of the sidelink channel prior to communication of the sidelink traffic information 214.

The channels or carriers illustrated in FIG. 2 are not necessarily all the channels or carriers that may be utilized between a scheduling entity 202 and scheduled entities 204, and those of ordinary skill in the art will recognize that other channels or carriers may be utilized in addition to those illustrated, such as other traffic, control, and feedback channels.

Figure 3:
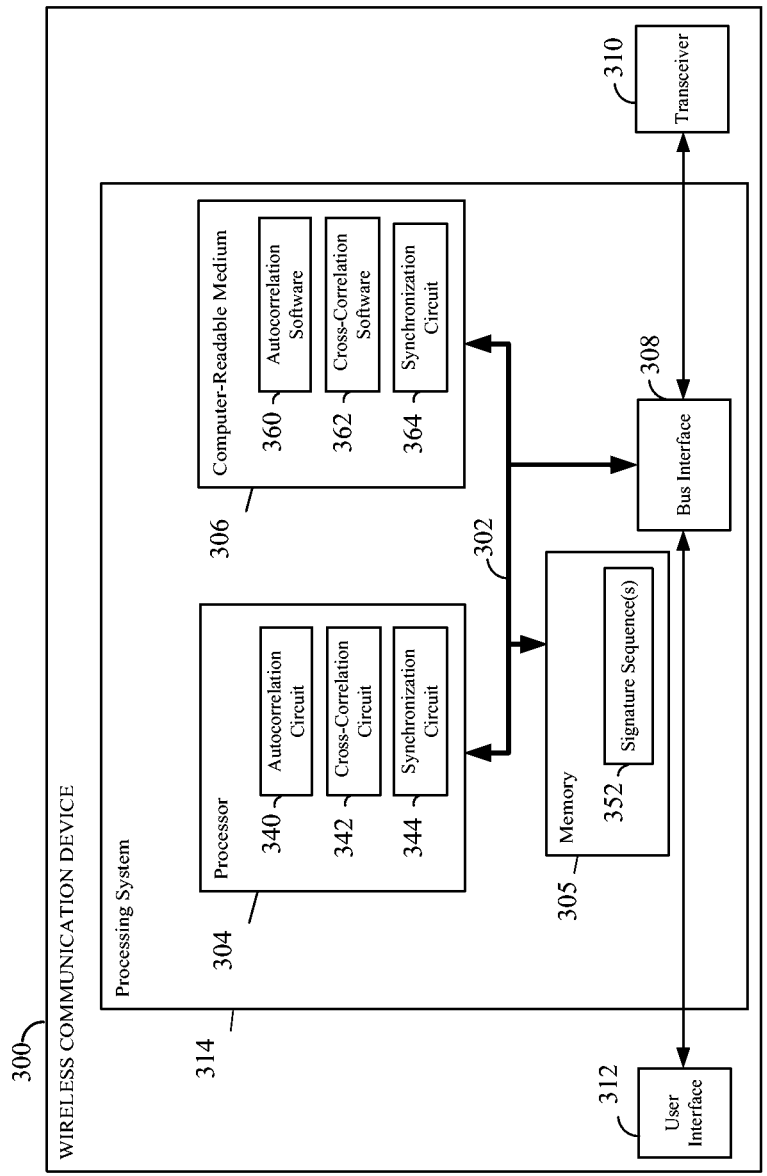
FIG. 3 is a block diagram conceptually illustrating an example of a wireless communication device according to some embodiments.

FIG. 3 is a simplified block diagram illustrating an example of a hardware implementation for a wireless communication device 300 employing a processing system 314. For example, the wireless communication device 300 may be a user equipment (UE) as illustrated in FIG. 1. In another example, the wireless communication device 300 may be a base station as illustrated in FIG. 1. In another example, the wireless communication device 300 may be a scheduling entity 202 as illustrated in FIG. 2. In another example, the wireless communication device 300 may be a scheduled entity 204 as illustrated in FIG. 2.

The wireless communication device 300 may be implemented with a processing system 314 that includes one or more processors 304. Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 300 may be configured to perform any one or more of the functions described herein. That is, the processor 304, as utilized in a wireless communication device 300, may be used to implement any one or more of the processes and functions described below and illustrated in FIGS. 4-9.

In this example, the processing system 314 may be implemented with a bus architecture, represented generally by the bus 302. The bus 302 may include any number of interconnecting buses and bridges depending on the specific application of the processing system 314 and the overall design constraints. The bus 302 communicatively couples together various circuits including one or more processors (e.g., represented generally by the processor 304), a memory 305, and computer-readable media (e.g., represented generally by the computer-readable medium 306). The bus 302 may also link various other circuits such as timing sources, peripherals, voltage regulators, and power management circuits, which are well known in the art, and therefore, will not be described any further. A bus interface 308 provides an interface between the bus 302 and a transceiver 310. The transceiver 310 provides a communication interface and/or a means for communicating with various other apparatus over a transmission medium. Depending upon the nature of the apparatus, a user interface 312 (e.g., keypad, display, speaker, microphone, joystick) may also be provided.

In some aspects of the disclosure, the processor 304 may include autocorrelation circuitry 340 configured for various functions, including, for example, determining an autocorrelation of a sensed signal. For example, the autocorrelation circuitry 340 may be configured to implement one or more of the functions described below in relation to FIGS. 5-7, including, e.g., block 604 of FIG. 6.

In some aspects of the disclosure, the processor 304 may include cross-correlation circuitry 342 configured for various functions, including, for example, determining a cross-correlation between a detected signature sequence and a stored signature sequence 352. For example, the cross-correlation circuitry 342 may be configured to implement one or more of the functions described below in relation to FIGS. 5-7, including, e.g., blocks 610 and/or 618 of FIG. 6.

In some aspects of the disclosure, the processor 304 may include synchronization circuitry 344 configured for various functions, including, for example, performing frequency error correction using a detected signature sequence, and/or performing time synchronization based on a detected signature sequence.

The processor 304 is responsible for managing the bus 302 and general processing, including the execution of software stored on the computer-readable medium 306. The software, when executed by the processor 304, causes the processing system 314 to perform the various functions described below for any particular apparatus. The computer-readable medium 306 and the memory 305 may also be used for storing data that is manipulated by the processor 304 when executing software.

One or more processors 304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 306 may include autocorrelation software 360 configured for various functions, including, for example, determining an autocorrelation of a sensed signal. For example, the autocorrelation software 360 may be configured to implement one or more of the functions described below in relation to FIGS. 5-7, including, e.g., block 604 of FIG. 6.

In some aspects of the disclosure, the computer-readable storage medium 306 may include cross-correlation software 362 configured for various functions, including, for example, determining a cross-correlation between a detected signature sequence and a stored signature sequence 352. For example, the cross-correlation software 362 may be configured to implement one or more of the functions described below in relation to FIGS. 5-7, including, e.g., blocks 610 and/or 618 of FIG. 6.

In some aspects of the disclosure, the computer-readable storage medium 306 may include synchronization software 364 configured for various functions, including, for example, performing frequency error correction using a detected signature sequence, and/or performing time synchronization based on a detected signature sequence.

One example of a wireless network that utilizes unlicensed band is Wi-Fi defined by IEEE 802.11 standards. In Wi-Fi networks, devices share access to an unlicensed band using a listen-before-talk (LBT) or carrier sense (CS) algorithm that involves clear channel assessment (CCA) and a network allocation vector (NAV). CCA involves a device detecting and decoding a Wi-Fi preamble transmitted by another device as a part of a physical layer convergence protocol (PLCP) frame. Within the preamble is included a legacy short training field (L-STF) and a legacy long training field (L-LTF), which include information that allows a device to detect the signal, perform frequency offset estimation, timing synchronization, etc. The L-STF includes 10 short training symbols, each having a length of 0.8 µs. The L-LTF includes two long training symbols, each having a length of 3.2 µs.

If a device senses or detects a Wi-Fi signal preamble, it will report the carrier as busy for the length of the frame. CCA further involves the device detecting the energy level of noise and interference on the carrier from non-Wi-Fi sources. The carrier may be reported as busy if an energy detection sample indicates energy above a given threshold. The NAV enables a device to explicitly reserve the carrier for transmission of a number of frames after the current frame. This reservation is made by encoding corresponding information in the PLCP frame header.

Various aspects of the present disclosure provide for the coexistence of a variety of systems and technologies for wireless communication on a shared spectrum. This coexistence may be provided by a technology-neutral signature waveform (e.g., a signature sequence) transmitted in front of an information burst, the signature sequence acting as a channel occupation signal.

A shared spectrum may include one or more bands or channels that may be shared by two or more different systems. As used in the present disclosure, a system may refer to an operator network and/or a radio access technology (RAT). That is, the shared spectrum channel may be shared by two or more operator networks using the same RAT, and/or two or more RATs, each of which may be utilized by one or more operator networks within the respective RAT.

A shared spectrum may be considered in some ways to be similar to an unlicensed band, such as the 2.4 GHz band used by Wi-Fi, Bluetooth, and a number of other different systems and technologies. However, unlike an unlicensed band, the shared spectrum may not completely unrestricted. That is, not any arbitrary technology may be allowed or sanctioned to access the shared spectrum. Rather, an agreement may be established where certain technology restrictions may be in place to limit which systems and technologies may access and use the shared spectrum.

In a particular implementation, the shared spectrum may occupy any suitable band, such as but not limited to a 3.5 GHz band. In some examples, multiple operators with the same radio access technology (RAT) may occupy the shared spectrum. In some examples, multiple RATs may occupy the shared spectrum. Further, potentially new technologies may be added in the future to the list of users of the shared spectrum. Broadly, any suitable number of different systems (e.g., different RATs, and/or different operators within each RAT) may share the shared spectrum when they comply with the predetermined or agreed technology restrictions on its use. In some examples, the technology restrictions may employ a coexistence mechanism.

According to an aspect of the disclosure, a suitable coexistence mechanism common across different operators and across different RATs may be defined to enable this variety of different systems to share the shared spectrum. Across different operators using the same RAT, and across networks using different RATs, a common understanding between these systems can enable users of the different systems to be aware of one another and achieve fair access to the shared spectrum. For example, each user of the shared spectrum may transmit a signature sequence that may be detected by a user of a different operator and/or different RAT.

As briefly described above, Wi-Fi technology employs a certain CS mechanism to control access to its unlicensed band. However, the Wi-Fi mechanism, including the predetermined or predefined preamble described above, is not suitably forward-compatible to enable new technologies to share the unlicensed band when those new technologies may employ vastly different communication mechanisms incompatible with their predecessor technologies. That is, any new Wi-Fi versions must repeat the same preamble, which restricts the technology. On the other hand, in some aspects of the present disclosure, the signature sequence may be generalized and the exact sequence may not be predefined.

Furthermore, the Wi-Fi preamble does not have suitable penetration that may be desired for the shared spectrum channel described above (e.g., cannot be reliably detected at −6 dB SNR). For the shared spectrum channel, it may be desired to employ the simplest possible mechanism, to reduce any restrictions that are placed on the different systems or technologies to enable them to understand one another. Moreover, across the different systems on the shared spectrum, or even within the same system, there may or may not be time synchronization.

Therefore, a special, technology-neutral signature waveform (e.g., a signature sequence) may be defined such that users of different systems and/or technologies can detect and to a certain degree understand each other. This signature sequence may act as a coexistence mechanism to allow interoperability among different systems on a shared spectrum channel.

Figure 4:
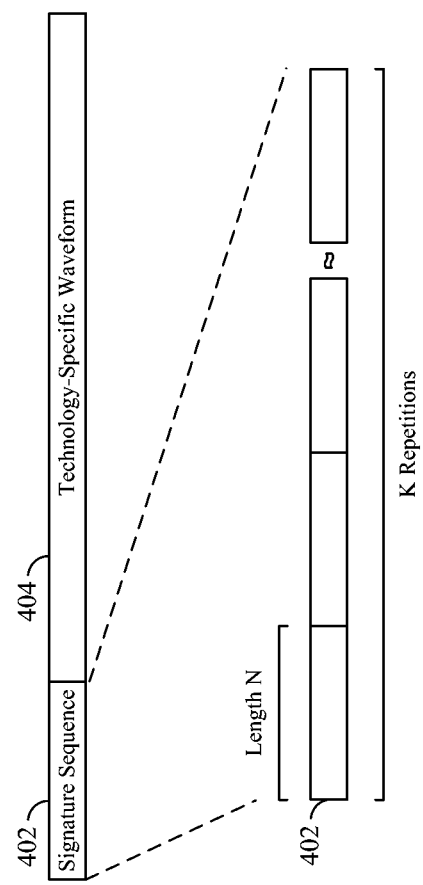
FIG. 4 is a schematic illustration of a transmission including a signature sequence on a shared spectrum channel according to some embodiments.

FIG. 4 is a schematic illustration of a transmission on a shared spectrum channel including a signature sequence 402 according to an aspect of the disclosure. As illustrated in FIG. 4, a signature sequence 402 may be transmitted as a preamble to the transmission of a technology-specific waveform 404. A technology-specific waveform refers to a waveform that complies with the specific technical requirement to access and communicate using a specific system or technology. As described in further detail below, the signature sequence may include a signature, a pattern, or a waveform having a length or a duration of N (e.g., N samples at a sample rate of R). This transmission may be repeated in the signature sequence K times.

The signature sequence mechanism described herein below may be similar in some ways to the CS algorithm used by Wi-Fi, briefly described above. However, the signature sequence mechanism exhibits several differences that will be described in more detail below, some of which may provide for improved future compatibility and coexistence of a broad range of different systems.

Figure 5:
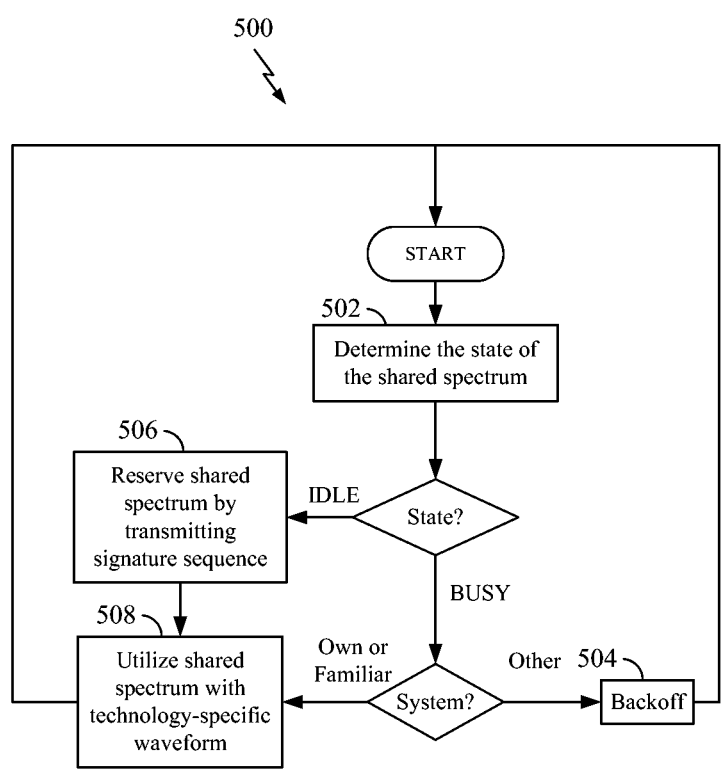
FIG. 5 is a flow chart illustrating a process for coexistence among systems in a shared spectrum channel according to some embodiments.

FIG. 5 is a flow chart illustrating a process 500 for coexistence among systems in a shared spectrum according to an aspect of the disclosure. Here, at block 502, a device may determine the state of a shared spectrum channel. For example, the state of the shared spectrum channel may be idle or busy. This determination may be made by monitoring or sensing the shared spectrum channel and detecting any signature sequence being transmitted on the shared spectrum channel, as described in further detail below. If the shared spectrum channel is busy (i.e., a system is utilizing the shared spectrum), then the device may determine if the system utilizing the shared spectrum is the device's own system, or optionally, some other system with which the device is capable of communicating. If the system is the device's own system or such a familiar system, then the process may proceed to block 508 and the device may utilize the shared spectrum channel by communicating with that system, utilizing technology-specific waveforms and access methods corresponding to that system.

On the other hand, if the state of the shared spectrum is idle, then at block 506 the device may reserve the shared spectrum by transmitting a signature sequence, as described in further detail below. After the shared spectrum is reserved, at block 508, the device may utilize the shared spectrum with a technology-specific waveform.

Figure 6:
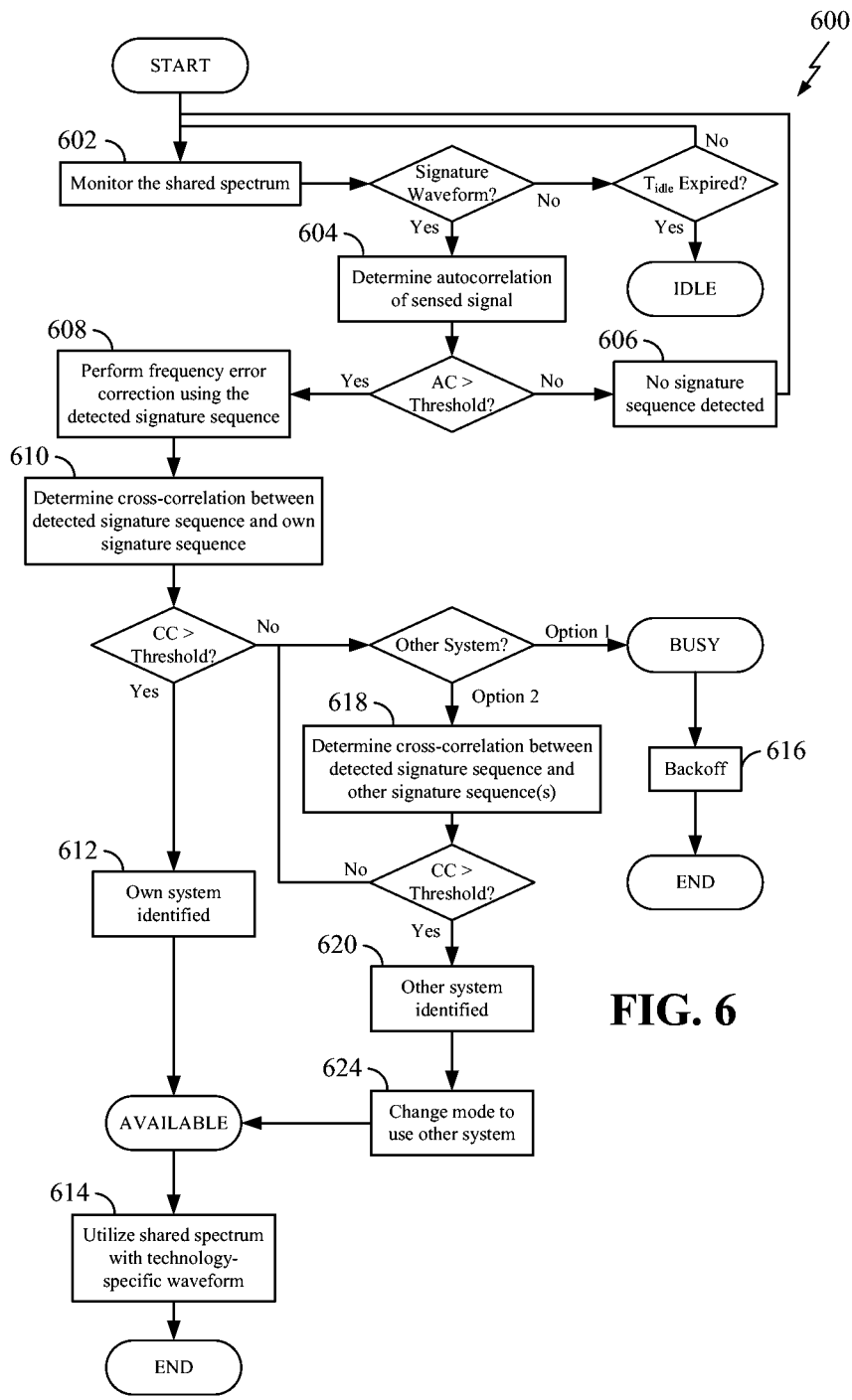
FIG. 6 is a flow chart illustrating another process for coexistence among systems in a shared spectrum channel according to some embodiments.
Figure 7:
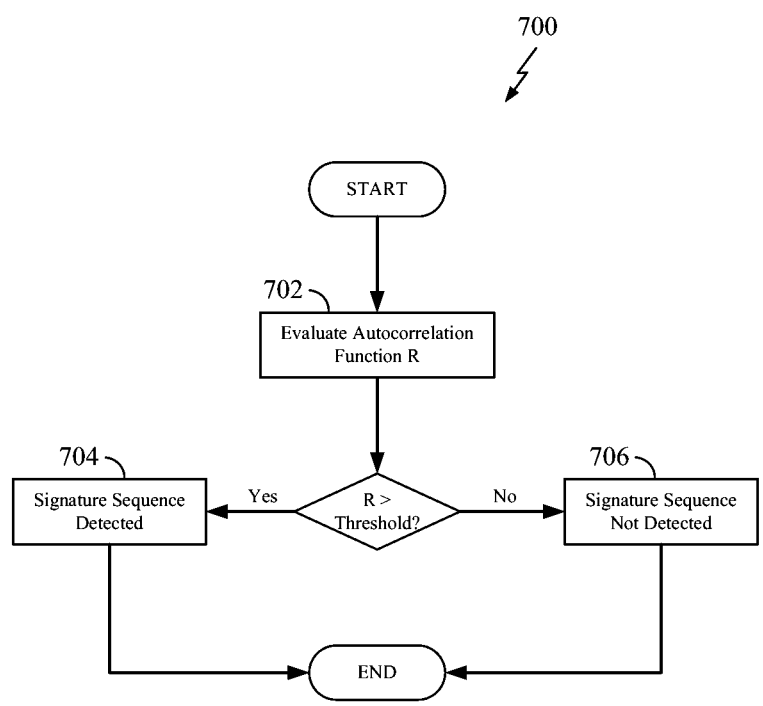
FIG. 7 is a flow chart illustrating a process for detecting a signature sequence using autocorrelation according to some embodiments.

FIG. 6 is a flow chart illustrating a process 600 for coexistence among systems in a shared spectrum according to a further aspect of the disclosure.

At block 602, a device may monitor a shared spectrum channel. In one example, the device may utilize a receiver 310 (see FIG. 3) to attempt to detect a waveform that may include a signature sequence on the shared spectrum. Here, a signature sequence may be characterized by a set of one or more signature sequence parameters. These signature sequence parameters may be common to all systems that utilize the shared spectrum, and may be utilized by the device to monitor the shared spectrum channel.

By virtue of their use of common signature sequence parameters, all systems using the shared spectrum may be enabled to understand each signature sequence, even if the different systems have never operated together before, and even if the different systems use dramatically different technology-specific waveforms on the shared spectrum. Thus, a device need not necessarily include a special circuit or hardware to understand the waveform that may be transmitted over the shared spectrum by other systems.

According to some aspects of the disclosure, signature sequence parameters may include a sample rate R, a length N, and a number of repetitions K. For example, the sample rate R may be 1 µs, the length N may consist of 32 samples, and the number of repetitions K may consist of 32 repetitions. The repetitions of the signature sequence result in a high autocorrelation. Of course, any other suitable values may be used for any of the signature sequence parameters. The sequence within the length N (or in some examples, a portion of the sequence within the length N) may be the unique or defining characteristic of a sequence that identifies the system or RAT transmitting that sequence.

According to an aspect of the present disclosure, the signature sequence may be characterized as a time-domain pattern that a receiving device can detect and identify. In some examples, a receiving device may use an autocorrelation detector to detect the presence of a signature sequence. That is, as described above, a signature sequence may be characterized by a known sampling rate R, a number of samples N, and a repetition factor K. With a suitable repetition factor, and with the known sampling rate and number of samples, a signature sequence transmission may exhibit a relatively high autocorrelation, enabling detection of the presence of a signature sequence.

In some examples, if a device monitoring the shared spectrum channel does not detect a signature waveform (or detect an unknown signature waveform) for a time greater than a certain duration of time $T_{idle}$, then the device may determine that the shared spectrum channel is in an idle state.

If a signature sequence or waveform is sensed or detected, then at block 604, the device may utilize an autocorrelation circuitry 340 to determine the autocorrelation of the sensed signal. A determination of an autocorrelation involves a calculation of the correlation of a signal with itself at different points in time, to find repeating patterns. The details of the calculation of an autocorrelation are known to those of ordinary skill in the art. For example, referring to FIG. 7, the device may evaluate an autocorrelation function R to detect the signature sequence at block 702. The autocorrelation function R may generate a value between −1 and 1. A value of 1 indicates perfect correlation, while a value of −1 indicates perfect anti-correlation (i.e., opposite of perfect correlation). In some aspects of the disclosure, if the device determines that the value of the function R is greater than a predetermined threshold, the device may determine that a signature sequence is detected at block 704; otherwise, no signature sequence is detected at block 706. Due to the structure of the repeated signature sequence, if a receiving device uses an autocorrelation receiver (e.g., autocorrelation circuitry 340 and transceiver 310 of FIG. 3), the receiver does not need to know the exact sequence to detect its presence. In other words, the receiver can detect the sequence of other systems (other operators or even other RATs). The receiving device needs only know the repetition pattern, which may be contained within the signature sequence parameters R, N, and K, described above. The use of an autocorrelation receiver can have the additional benefit that it is robust to frequency errors. Thus, even if a crystal oscillator at the receiver is not very accurate, the autocorrelation could still function properly.

If the autocorrelation of the sensed signal determined at block 604 is not greater than an autocorrelation threshold, then at block 606, the device may determine that no signature sequence is detected. While this may indicate that the shared spectrum channel is idle, in an aspect of the present disclosure, the spectrum may be determined to be idle when no signature sequence is detected over a time greater than $T_{idle}$. Therefore, when no signature sequence is detected, the process may return to block 602 to continue monitoring the shared spectrum channel for signature waveforms.

Once a signature sequence is detected (e.g., when the determined autocorrelation of the sensed signal is greater than an autocorrelation threshold), then at block 608 the receiving device may utilize synchronization circuitry 344 to perform frequency error correction using the detected signature sequence. For example, the frequency error can be estimated by comparing the phase of the different periods of the received signature sequence. The estimated frequency error can be used to generate a phase ramping signal and multiplied to the received signature sequence to compensate the frequency error.

In some aspects of the disclosure, a device using the shared spectrum may detect whether a signature sequence identifies its own system (or a familiar system), in which case it may use the channel based on the access rules or methods of the identified system; or if it identifies some other system, in which case it may wait until the channel is available or idle.

Thus, at block 610, the device may utilize cross-correlation circuitry 342 to determine a cross-correlation between the same set of samples of the detected signature sequence and a predicted or known signature sequence corresponding to the device's own system. For example, the device may store one or more signature sequences 352 in memory 305 (see FIG. 3).

The determination of a cross-correlation involves a calculation of the similarity or correlation between the detected signature sequence and a predicted or known signature sequence that the device may have stored in memory. Those of ordinary skill in the art are well aware of the calculation of a cross-correlation. If the cross-correlation between the detected signature sequence and a predicted signature sequence corresponding to the device's own system is greater than a cross-correlation threshold, then at block 612 the device may determine that its own system has been identified using the shared spectrum channel, and the channel may be determined to be available. Accordingly, at block 614, the device may utilize the shared spectrum channel to communicate with the device's own system with technology-specific waveforms.

On the other hand, if the detected signature sequence does not indicate the device's own system (i.e., the cross-correlation between the detected signature sequence and the signature sequence of the device's own system determined at block 610 is not greater than a cross-correlation threshold), then some other technology may occupy the shared spectrum channel. In some aspects of the disclosure (option 1), the process may stop, and at block 616, the device may back off for a suitable time (back off time) to leave the shared spectrum to the other technology. That is, the device forgoes using the shared spectrum channel for a predetermined back off time. The device may try the shared spectrum again later.

In some aspects of the disclosure (option 2), if the receiving device detects a different system, but the receiver is capable of identifying and handling that system, then the receiver may change its mode to process that other system.

That is, if the device detects a signature sequence corresponding to a system other than the device's own system, as described above, the signature sequence may still correspond to one or more other systems with which the device is capable of communicating over the shared spectrum. If there are any other such systems, then at block 618, the device may utilize the cross-correlation circuitry 342 to determine a cross-correlation between the same set of samples of the signature sequence and one or more other predicted or known signature sequences to attempt to identify the signature sequence.

If the receiver knows the sequence and is capable of communicating utilizing technology-specific waveforms corresponding to the identified system (e.g., if the detected signature sequence corresponds to some earlier version of the same system, or any other system where the receiver is capable of processing its data), then at block 620, the receiving device may determine that a familiar system is identified. At block 624, the receiver may change its mode to that other format, and the device may determine that the channel is available for communication. Accordingly, at block 614, the device may communicate using data in the other technology-specific waveform.

Figure 8:
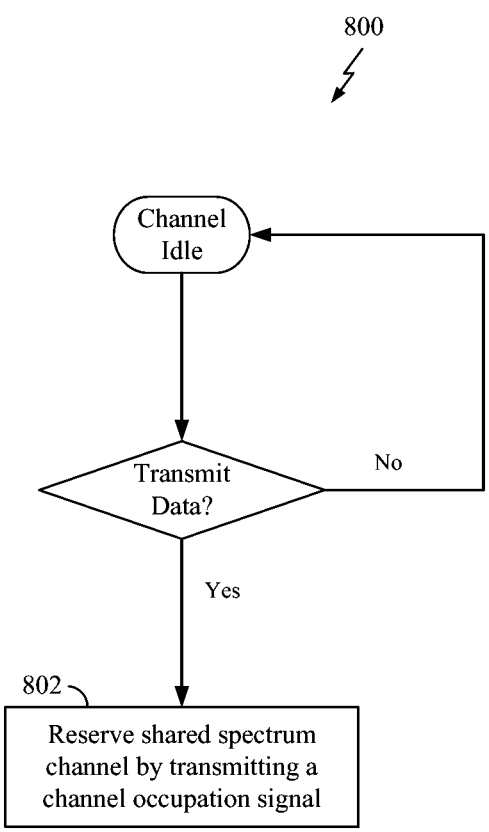
FIG. 8 is a flow chart illustrating a process for reserving a shared spectrum channel according to some embodiments.

FIG. 8 is a flow chart illustrating a process 800 for reserving a shared spectrum channel according to a further aspect of the disclosure. The process 800 may be performed by the device 300 of FIG. 3 or any apparatus. As described above, in an aspect of the disclosure, if no signature sequence is detected for a time greater than $T_{idle}$, then the device may determine that the shared spectrum channel is idle. When the shared spectrum channel is idle, if the device has data to transmit, the device may reserve the shared spectrum channel at block 802 by utilizing a transmission of the signature sequence as a channel occupation signal to other devices utilizing the shared spectrum. For example, the device may utilize its transceiver 310 to transmit its signature sequence or waveform as the channel occupation signal. If the device has no data to transmit, the device may continue to monitor the idle channel until the device has data to transmit. In a further detail, a device may transmit a signature sequence at the beginning of a transmission burst (e.g., prior to utilizing the shared spectrum channel with a technology-specific waveform). That is, a device may transmit the special, technology-neutral waveform (e.g., a signature sequence) as a preamble to serve as a channel occupation signal. The signature sequence may be transmitted before each data burst, before an LBT frame, or before a sequence of data bursts from a node.

For example, as described above, systems using the shared spectrum may utilize any suitable signature sequence that follows the signature sequence parameters, such as a sampling rate R, a number of samples N, and K repetitions. With this flexibility, new systems may be deployed over time, each of which may define their own waveform or signature sequence as long as it follows the signature sequence parameters (e.g., R, N, and K).

According to an aspect of the present disclosure, the signature sequence may be configured as a time-domain waveform having a reasonably constant envelope and exhibiting a low peak-to-average power ratio (PAPR). In one example, the PAPR of the signature sequence is below a predetermined PAPR threshold. In some examples, the modulation to use may be selected to satisfy the PAPR requirement of the signature sequence. A signature sequence may utilize a waveform with any suitable modulation including but not limited to binary phase shift keying (BPSK), quadrature phase shift keying (QPSK), etc. Typically lower modulation order can lead to lower PAPR. Therefore, the choice of modulation affects PAPR. For example, if pi/2-BPSK is used, the PAPR can be lower than that when direct BPSK is used. In some examples, the signature sequence itself (i.e., the pattern of the sequence) may be selected based on its PAPR. That is, it may occur that some sequences or patterns may exhibit a relatively high PAPR, and thus these sequences may be avoided.

In some examples, each system (e.g., each operator network within the same RAT, and/or each different RAT) that accesses the shared spectrum may use a unique or distinguishable signature sequence.

For example, a system may use the signature sequence as a RAT identifier, that is, to identify the technology of different systems that share the shared spectrum. Different RATs may use different sequences, although each signature sequence may conform to a common set of one or more signature sequence parameters, such as a sample rate R, a number of samples N, and a repetition of the number of samples K. When a new RAT is designed or added to the shared spectrum, its designers can select a new sequence that conforms to the parameters described above. Across different RATs, there is generally no need to understand the technology specific part of the waveform.

In another example, a system may use the signature sequence as an operator identifier within the same RAT. That is, the signature sequence may identify the operator network from among different operator networks that share the shared spectrum. Different operators may use different signature sequences, although, as described above, each signature sequence may conform to a common set of one or more signature sequence parameters. When a new operator is added to the shared spectrum, the new operator can select a new sequence that conforms to the parameters described above. Here, because the same RAT is used by two or more operator networks that share the shared spectrum, after a device determines that the signature sequence belongs to a different operator with the same RAT, the device may have the capability to process the waveform later to collect more information. For example, it may be possible for some level of interoperability of a device on two or more operator networks that utilize the shared spectrum.

In an aspect of the disclosure, the structure of the signature sequence described above may alternatively be interpreted as a variation of a single tone beacon. Single tone beacons may be transmitted, e.g., as a sine wave at a certain frequency. The benefit of a single tone beacon is that the receiver can have very low complexity, and may simply perform an FFT of the received tone to detect a peak at the tone location. However, an issue with such a single tone beacon is that it may exhibit very high power at that particular frequency, potentially in violation of regulations for the spectrum. Further, such a single tone beacon may provide poor time domain resolution, and another sequence (e.g., a primary synchronization signal or PSS) may be needed to recover timing.

A repeated signature sequence as described in the present disclosure may be considered similar to a comb-like beacon. For a design of a signature sequence having a length N sequence with K repetitions, the frequency domain may be a comb structure with 1 tone every K tones. Due to the comb structure, the emission power regulations may be reduced, and can be satisfied with the power being distributed over the entire band. The sequence design then becomes the design of the modulation of the symbols carried in the active tone structure. In a further aspect of the disclosure, a signature sequence may carry additional information beyond the sequence used as the channel occupation signal. Here, including additional information in the signature sequence may come at the cost of higher error rates and worse PAPR properties relative to a signature sequence that omitted any further information. In general, the greater the amount of additional information included in a signature sequence, the greater the cost as described above.

Figure 9:
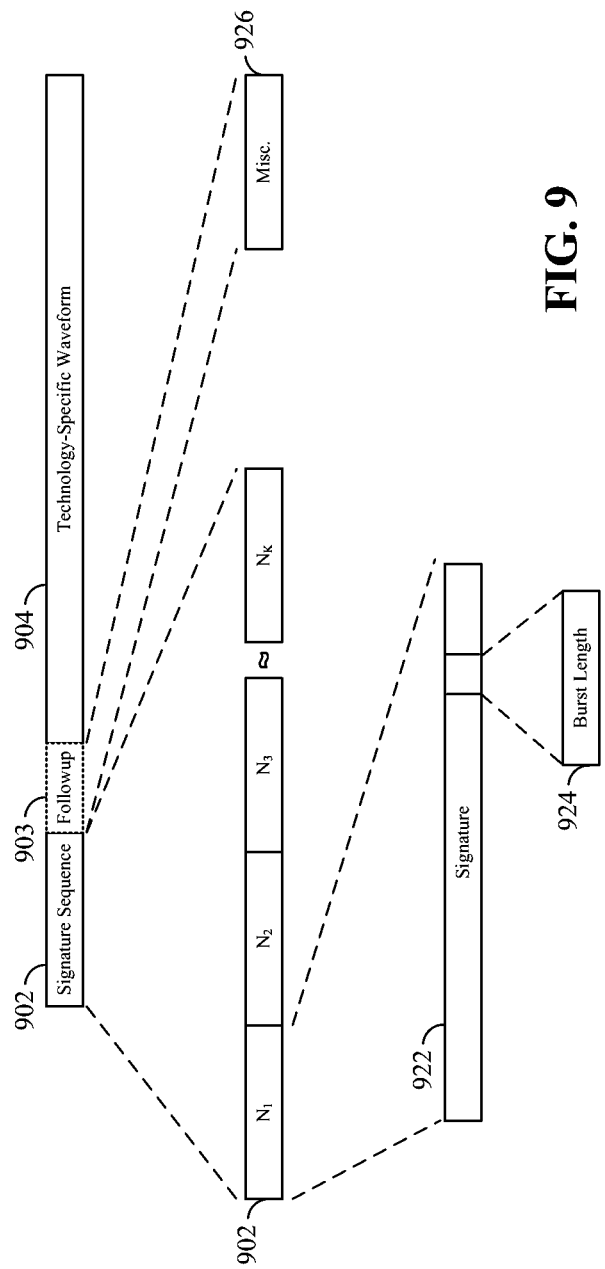
FIG. 9 is a schematic illustration of a transmission including a modified signature sequence and a follow-up waveform on a shared spectrum channel according to some embodiments.

FIG. 9 is a schematic illustration of a transmission on a shared spectrum channel according to a further aspect of the disclosure. As illustrated in FIG. 9, a transmission may include a preamble including a signature sequence 902, a follow-up waveform 903, and a technology-specific waveform 904. As in the previous examples (e.g., see FIG. 4), the signature sequence may include a signature or waveform having a length of N, repeated over K repetitions.

In some examples, a signature sequence 902 may be configured to include the signature 922 acting as a channel occupation signal. That is, the signature 922 may be configured to identify the system transmitting that sequence. However, in a further aspect of the disclosure, the signature 922 may be configured to indicate information beyond the identity of the system transmitting the sequence. For example, the signature 922 may be configured to include burst duration information indicating the length of the technology specific waveform or burst that follows the signature sequence. In one particular example, the burst duration information 924 may consist of a quantized length (e.g., 1 bit of information to distinguish a long burst and short burst). For example, devices using the shared spectrum may be made aware of short and long burst durations, which may have any suitable duration, e.g., a short burst of 1 ms and a long burst of 10 ms. In this example, as illustrated in FIG. 9, the signature 922 may be configured according to signature A to indicate a short burst, and according to signature B to indicate a long burst. Of course, any suitable number of bits of information relating to a burst duration may be signaled via the signature sequence, to indicate any suitable granularity of the size of a burst, e.g., up to a specific number indicating the full burst length.

Beyond the signature information 922 and the burst duration information 924, the signature sequence 902 may further be configured to convey any other suitable miscellaneous information. For example, the signature sequence waveform may be configured to carry information such as physical cell identifier (PCI), or a portion of a PCI.

Alternatively, if a particular implementation requires many more extra bits at the beginning of a burst, in a further aspect of the disclosure, a follow-up waveform 903 may be included following the signature sequence 902. The follow-up waveform 903 may include any suitable payload information.

The structure of the follow-up waveform 903 may take any suitable form, including but not limited to an orthogonal frequency division multiple access (OFDMA) signal, a time division multiple access (TDMA) signal, etc. Here, it may be possible for a receiving device to use a coherent receiver to detect the follow-up waveform 903. Use of the follow-up waveform 903 in this fashion can provide a more efficient way to deliver a large payload compared to including the payload (e.g., the burst duration 924 and/or the miscellaneous waveform 926) in the signature sequence 902. To utilize the follow-up waveform 903, the receiver may generally need to know which RAT is transmitting the follow-up waveform. Accordingly, the device may identify the RAT based on the signature sequence prior to decoding the follow-up waveform.

Different systems using the shared spectrum may or may not be synchronized with one another in different implementations. Synchronization in this context refers to the different systems, and the nodes using the respective systems, having a common timing with one another (e.g., boundaries in symbols, samples, or subframes may be aligned).

In an example where the different systems utilizing the shared spectrum are synchronized, then detection and identification of the signature sequence may be simplified. For example, if the sample boundaries were known, detection of the signal would be simplified, as the receiver would have small number of timing hypotheses to test. Here, there may be some amount of propagation delay between the transmission and reception of the signature sequence, introducing some uncertainty, so while the number of timing hypotheses may be reduced relative to an unsynchronized system, it may be greater than one because of the uncertainty. Further, because there are relatively few timing hypotheses, then after the cross-correlation step, there would be almost no timing ambiguity. Therefore, no extra waveform would be needed for timing recovery. The signature sequence may be directly followed by the technology specific waveform. In some examples, a suitable filler signal may be used between the signature sequence and the technology-specific waveform if the technology specific waveform can only start at certain time instance, such as a subframe or slot boundary.

On the other hand, in an example where the different systems utilizing the shared spectrum are not synchronized, the signature sequence may potentially arrive at any arbitrary time, so there are a greater number of hypotheses to test. Even after the cross-correlation step, there may remain some timing ambiguity. Particularly at a low SNR, the repeated signature sequence may have a low timing resolution. It may be difficult to distinguish a sequence from a shifted version of itself due to timing ambiguity at a multiple of N. For example, a sequence may have a delay of a multiple of N, and the receiving device failed to detect one or more of the repeated signatures of length N. Thus, a signature sequence may be followed by a separate timing recovery sequence, so that a receiving device may use coherent detection to recover timing. This timing recovery sequence may be technology specific, or it may be in a technology-neutral format. For example, another time domain waveform may follow the signature sequence, providing a higher timing resolution than the signature sequence.

This coherent detection step may be performed after the frequency error correction step. The auto-correlation detector of the repeated signature sequence may serve as a trigger for the coherent detection of the timing recovery sequence. The timing recovery sequence may then search only over the timing uncertainty from the auto-correlation step. In some examples, this timing recovery sequence may also provide for channel estimation (e.g., a phase reference) of the later waveform.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-9 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-9 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one" of a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication operable at a wireless communication device, comprising:
    monitoring a shared spectrum channel to detect a transmission of a technology-neutral signature waveform that is detectable by devices of two or more different systems to act as a channel occupation signal to facilitate sharing of a spectrum channel by the two or more different systems, the monitoring comprising:
        sensing a signal on the shared spectrum channel;
        determining an autocorrelation of the sensed signal; and
        if the autocorrelation is greater than an autocorrelation threshold, determining that the shared spectrum channel carries the technology-neutral signature waveform;
    if the technology-neutral signature waveform is detected from a first system the wireless communication device is configured to use, monitoring the shared spectrum channel for a first technology-specific waveform corresponding to the first system; and
    if the technology-neutral signature waveform is not detected for a time greater than a threshold amount of time, determining that the shared spectrum channel is idle.

2. The method of claim 1, further comprising:
    if the technology-neutral signature waveform is detected from a second system known to the wireless communication device, forgoing to use the shared spectrum channel for a back off time, or monitoring the shared spectrum channel for a second technology-specific waveform corresponding to the second system; and
    if the technology-neutral signature waveform is detected from a third system with an unknown signature waveform, forgoing to use the shared spectrum channel for the back off time.

3. The method of claim 2, further comprising:
    performing frequency error correction using the detected technology-neutral signature waveform.

4. The method of claim 2, further comprising:
determining a first cross-correlation between the detected technology-neutral signature waveform and a stored signature sequence corresponding to the first system corresponding to the wireless communication device; and
if the first cross-correlation is greater than a cross-correlation threshold, determining that the shared spectrum channel is occupied by the first system corresponding to the wireless communication device.

5. The method of claim 4, further comprising:
if the first cross-correlation is not greater than the cross-correlation threshold, determining a second cross-correlation between the detected technology-neutral signature waveform and a stored signature sequence corresponding to the second system known to the wireless communication device; and
if the second cross-correlation is greater than the cross-correlation threshold, determining that the shared spectrum channel is occupied by the second system known to the wireless communication device.

6. The method of claim 5, further comprising:
if the first cross-correlation is not greater than the cross-correlation threshold, and if the second cross-correlation is not greater than the cross-correlation threshold, determining that the shared spectrum channel is occupied by the third system with an unknown signature waveform.

7. The method of claim 1, wherein the shared spectrum channel is determined to be idle, the method further comprising:
transmitting a technology-neutral signature waveform to reserve the shared spectrum channel; and
communicating with one or more devices utilizing the first technology-specific waveform.

8. The method of claim 7, wherein the transmitting the technology-neutral signature waveform comprises:
transmitting the transmitted technology-neutral signature waveform having a sample rate R and a number of samples N; and
repeating the transmitting of the transmitted technology-neutral signature waveform over K repetitions, wherein R, N, and K are positive integers, respectively.

9. The method of claim 7, wherein the transmitting the transmitted technology-neutral signature waveform comprises modulating the transmitted technology-neutral signature waveform utilizing binary phase shift keying (BPSK) or quadrature phase shift keying (QPSK).

10. The method of claim 7, further comprising:
selecting the transmitted technology-neutral signature waveform to have a peak-to-average power ratio (PAPR) below a PAPR threshold.

11. The method of claim 7, further comprising transmitting burst duration information with the transmitted technology-neutral signature waveform, the burst duration information indicating a duration of the first technology-specific waveform,
wherein the transmitting of the transmitted technology-neutral signature waveform further comprises repeating the transmitting of the burst duration information.

12. The method of claim 7, further comprising:
transmitting a follow-up waveform after the transmitted technology-neutral signature waveform, wherein the follow-up waveform carries payload information corresponding to the first technology-specific waveform.

13. A wireless communication device comprising:
a processor;
a memory communicatively coupled to the processor; and
a transceiver communicatively coupled to the processor,
wherein the processor and the memory are configured to:
monitor a shared spectrum channel to detect a transmission of a technology-neutral signature waveform that is detectable by devices of two or more different systems to act as a channel occupation signal to facilitate sharing of a spectrum channel by the two or more different systems, by:
sensing a signal on the shared spectrum channel;
determining an autocorrelation of the sensed signal; and
if the autocorrelation is greater than an autocorrelation threshold, determining that the shared spectrum channel carries the technology-neutral signature waveform;
if the technology-neutral signature waveform is detected from a first system the wireless communication device is configured to use, monitor the shared spectrum channel for a first technology-specific waveform corresponding to the first system; and
if the technology-neutral signature waveform is not detected for a time greater than a threshold amount of time, determine that the shared spectrum channel is idle.

14. The wireless communication device of claim 13, wherein the processor and the memory are further configured to:
if the technology-neutral signature waveform is detected from a second system known to the wireless communication device, forgo using the shared spectrum channel for a back off time, or monitor the shared spectrum channel for a second technology-specific waveform corresponding to the second system; and
if the technology-neutral signature waveform is detected from a third system with an unknown signature waveform, forgo using the shared spectrum channel for the back off time.

15. The wireless communication device of claim 14, wherein the processor and the memory are further configured to:
perform frequency error correction using the detected technology-neutral signature waveform.

16. The wireless communication device of claim 14, wherein the processor and the memory are further configured to:
determine a first cross-correlation between the detected technology-neutral signature waveform and a stored signature sequence corresponding to the first system corresponding to the wireless communication device; and
if the first cross-correlation is greater than a cross-correlation threshold, determine that the shared spectrum channel is occupied by the first system corresponding to the wireless communication device.

17. The wireless communication device of claim 16, wherein the processor and the memory are further configured to:
if the first cross-correlation is not greater than the cross-correlation threshold, determine a second cross-correlation between the detected technology-neutral signature waveform and a stored signature sequence corresponding to the second system known to the wireless communication device; and if the second cross-correlation is greater than the cross-correlation threshold, determine that the shared spectrum channel is occupied by the second system known to the wireless communication device.

18. The wireless communication device of claim 17, wherein the processor and the memory are further configured to:
if the first cross-correlation is not greater than the cross-correlation threshold, and if the second cross-correlation is not greater than the cross-correlation threshold, determine that the shared spectrum channel is occupied by the third system with an unknown signature waveform.

19. The wireless communication device of claim 13, wherein if the shared spectrum channel is determined to be idle, the processor and the memory are further configured to:
transmit a technology-neutral signature waveform to reserve the shared spectrum channel; and
communicate with one or more devices utilizing the first technology-specific waveform.

20. The wireless communication device of claim 19, wherein the processor and the memory are further configured to transmit the technology-neutral signature waveform by:
transmitting the transmitted technology-neutral signature waveform having a sample rate R and a number of samples N; and
repeating the transmitting of the transmitted technology-neutral signature waveform over K repetitions, wherein R, N, and K are positive integers, respectively.

21. The wireless communication device of claim 19, wherein the transmitting the transmitted technology-neutral signature waveform comprises modulating the transmitted technology-neutral signature waveform utilizing binary phase shift keying (BPSK) or quadrature phase shift keying (QPSK).

22. The wireless communication device of claim 19, wherein the processor and the memory are further configured to:
select the transmitted technology-neutral signature waveform to have a peak-to-average power ratio (PAPR) below a PAPR threshold.

23. The wireless communication device of claim 19, wherein the processor and the memory are further configured to:
transmit burst duration information with the transmitted technology-neutral signature waveform, the burst duration information indicating a duration of the first technology-specific waveform; and
transmit the transmitted technology-neutral signature waveform by repeating the burst duration information.

24. The wireless communication device of claim 19, wherein the processor and the memory are further configured to:
transmit a follow-up waveform after the transmitted technology-neutral signature waveform, wherein the follow-up waveform carries payload information corresponding to the first technology-specific waveform.

25. A non-transitory computer readable medium storing computer executable code comprising instructions operable at a wireless communication device for:
monitoring a shared spectrum channel to detect a transmission of a technology-neutral signature waveform that is detectable by devices of two or more different systems to act as a channel occupation signal to facilitate sharing of a spectrum channel by the two or more different systems, the monitoring comprising:
sensing a signal on the shared spectrum channel;
determining an autocorrelation of the sensed signal; and
if the autocorrelation is greater than an autocorrelation threshold, determining that the shared spectrum channel carries the technology-neutral signature waveform;
if the technology-neutral signature waveform is detected from a first system the wireless communication device is configured to use, monitoring the shared spectrum channel for a first technology-specific waveform corresponding to the first system; and
if the technology-neutral signature waveform is not detected for a time greater than a threshold amount of time, determining that the shared spectrum channel is idle.

26. The non-transitory computer readable medium of claim 25, further comprising instructions for:
if the technology-neutral signature waveform is detected from a second system known to the wireless communication device, forgoing to use the shared spectrum channel for a back off time, or monitoring the shared spectrum channel for a second technology-specific waveform corresponding to the second system; and
if the technology-neutral signature waveform is detected from a third system with an unknown signature waveform, forgoing to use the shared spectrum channel for the back off time.

27. A wireless communication device comprising:
means for monitoring a shared spectrum channel to detect a transmission of a technology-neutral signature waveform that is detectable by devices of two or more different systems to act as a channel occupation signal to facilitate sharing of a spectrum channel by the two or more different systems, the monitoring comprising:
sensing a signal on the shared spectrum channel;
determining an autocorrelation of the sensed signal; and
if the autocorrelation is greater than an autocorrelation threshold, determining that the shared spectrum channel carries the technology-neutral signature waveform;
means for if the technology-neutral signature waveform is detected from a first system the wireless communication device is configured to use, monitoring the shared spectrum channel for a first technology-specific waveform corresponding to the first system; and
means for if the technology-neutral signature waveform is not detected for a time greater than a threshold amount of time, determining that the shared spectrum channel is idle.

28. The wireless communication device of claim 27, further comprising:
means for if the technology-neutral signature waveform is detected from a second system known to the wireless communication device, forgoing to use the shared spectrum channel for a back off time, or monitoring the shared spectrum channel for a second technology-specific waveform corresponding to the second system; and
means for if the technology-neutral signature waveform is detected from a third system with an unknown signature waveform, forgoing to use the shared spectrum channel for the back off time.

* * * * *